United States Patent [19]

Lindström

[11] 4,021,386
[45] May 3, 1977

[54] METHOD OF COMBINING AT LEAST TWO CHEMICAL REACTION COMPONENTS AND APPARATUS FOR CARRYING OUT THE METHOD

[76] Inventor: Gustav Verner Lindström, Box 37, S-340 33 Lonashult, Sweden

[22] Filed: Sept. 24, 1975

[21] Appl. No.: 616,419

[30] Foreign Application Priority Data

Sept. 30, 1974 Sweden ............................ 7412248

[52] U.S. Cl. ........................ 260/2.5 BC; 23/252 R; 260/2.5 BD; 261/18 B; 261/50 R; 261/76; 261/DIG. 26; 259/4 R
[51] Int. Cl.² .................................... B29D 27/02
[58] Field of Search ........ 261/DIG. 26, 50 R, 18 B, 261/76; 260/2.5 BC, 2.5 BD; 23/252 R; 259/4 R

[56] References Cited

UNITED STATES PATENTS

| 2,069,352 | 2/1937 | Brookshire et al. | 261/79 A |
|---|---|---|---|
| 2,373,009 | 4/1945 | Bedford | 261/DIG. 26 |
| 2,750,170 | 6/1956 | Joyce | 261/79 A |
| 2,825,413 | 3/1958 | Williams | 261/DIG. 26 |
| 2,990,380 | 6/1961 | Auerbach et al. | 260/2.5 BD |
| 3,096,001 | 7/1963 | Boe et al. | 260/2.5 BD |
| 3,105,745 | 10/1963 | Vieli | 23/252 R |
| 3,186,959 | 6/1965 | Shriver | 261/DIG. 26 |
| 3,434,805 | 3/1969 | Bay | 23/252 R |
| 3,794,299 | 2/1974 | Wagner | 23/252 R |

FOREIGN PATENTS OR APPLICATIONS 314,975  2/1934  Italy ........................... 261/DIG. 26

OTHER PUBLICATIONS

"New Portable Helix Mixer For Polyurethane Foam"; RE. Knox; June 17, 1963; Dupont, Wilmington Del., A-31781.
"Auto Froth I", Polytron Co., 661 S. Tenth St., Richmond, Calif.

Primary Examiner—Tim R. Miles
Attorney, Agent, or Firm—Flynn & Frishauf

[57] ABSTRACT

A method and apparatus for combining at least two chemical reaction components, a foam component which is caused to form a foam, and an aerosol component which is atomized to aerosol form, prior to their combination in a mixing chamber. In order to obtain a very homogeneous admixing of the aerosol component to the foam component for producing cell structures having very thin cell partition walls, the foam component is caused to rotate when it is being advanced through the mixing chamber and sprayed with the finely distributed droplets of the aerosol component.

17 Claims, 4 Drawing Figures

METHOD OF COMBINING AT LEAST TWO CHEMICAL REACTION COMPONENTS AND APPARATUS FOR CARRYING OUT THE METHOD

This invention relates to a method and apparatus for combining at least two chemical reaction components, a foam component which is caused to form a foam, and an aerosol component which is atomized to aerosol form, before the two components are combined in a mixing chamber.

It is previously known in connection with the production of cellular plastic from urea-formaldehyde resin to apply a method, at which a hardener solution including a foaming agent is foamed, and this foam is subjected to spraying with a solution of urea-formaldehyde resin in a so-called foam sprayer, which resin hardens to a solid foam consisting substantially of urea-formaldehyde plastic.

When making cellular plastic from urea-formaldehyde condensate, it is very important that the resin solution is uniformly distributed in the foam mass prior to the hardening of the resin, because otherwise a varying density and large voids in the cellular plastic are obtained when bubbles less coated with resin are cracking. It is, thus, essential that a portion as large as possible of the outer surface of each bubble is coated with resin.

It has been tried when using urea resin foam sprayers to achieve this objective by using stirrers to bring about tangential motions. The resulting effect, however, was small or none at all, because a stirrer imparts the same rotation to both the foam component and the aerosol droplets, which does not bring about a thorough mixing. With previous foam sprayers usually a non-homogeneous and one-side resin coat on the foam bubbles was obtained when the resin solution in aerosol form was sprayed on a foam component passing linearly through the mixing chamber.

It is a main object of the present invention to provide a method and apparatus according to above, in which the aerosol component is admixed to the foam component in a very homogeneous manner, so that it can be utilized advantageously for producing coherent cell structures with very thin cell partition walls. The method and apparatus is intended to be applicable also in order to obtain a chemical reaction product in another specified physical form, for example in the form of extremely thin flakes, thereby that the cell structure obtained from the foam component is permitted to disintegrate.

SUMMARY OF THE INVENTION

As, according to the invention, an improved mixing of the different reaction components is obtained, the mixture can be utilized also for a number of other purposes, in addition to the production of porous plastic. It can, for example, be used at a direct neutralization reaction between a basic and an acid substance, such as neutralization of sodium silicate with a sulphuric acid solution, the reaction product of which can be obtained in a definite physical form, such as cell structure, free laminae or branched fibre networks. This requires, however, very strongly that the quantities can be batched accurately in relation to each other, not only as an average over a certain period, but in each individual time interval, inclusive of the start and stop moments. It is, further, necessary that the same mixing proportions are obtained throughout the entire mass, because otherwise alternatingly alcalic and acid portions are obtained, i.e. a non-homogeneous final product.

The present invention distinguishes over the known state of the art particularly with respect to the way or the conditions under which the reaction components are combined in the mixing chamber. Another essential difference lies in the method the simultaneous feed of the different reaction components being used.

According to the invention, a rapid and effective homogenization of the foam and aerosol components is obtained as a result of the fact that the foam component is caused to rotate when it is being advanced through the mixing chamber and sprayed with the atomized droplets of the aerosol component. The foam component preferably is fed into the mixing chamber in the form of a helically rotating, substantially ring-shaped mass, which is sprayed with the aerosol component preferably having the form of a conically diverging jet originating from a point located on the central axis of said ring-shaped mass. The feed-in of the foam component may take place via an annular nozzle, to which the foam is advanced via helical grooves.

In order to additionally increase the portion of the outer surface of each bubble coated with the aerosol component, in a preferred embodiment also the bubbles are caused to rotate relative to each other in the foam when it is being advanced through the mixing chamber. This can be achieved, for example, by designing the helical grooves so that their outer end portions show slightly different pitches. As a result thereof, the different material flows will interfere with and impart irregular rotational motions to the bubbles of each other.

As the relative rotation of the foam bubbles and therewith the homogenization effect, depend on the speed at which the foam is pressed ahead through the helical grooves, it is necessary that the batching proportions are the same at each moment both for the two components and the compressed air applied at the foam production. These requirements are not met by any normally available needle valve or cock.

Said batching problems have been solved according to the invention by usual batching nozzles with adjustable needles in combination with special diaphragm valves controlled simultaneously by compressed air. Owing to the high pass capacity of the diaphragm valves in relation to the batching nozzles, the correct proportions between the components are obtained instantaneously, during the operation as well as at the start and stop moments.

DETAILED DESCRIPTION

Figure 1:
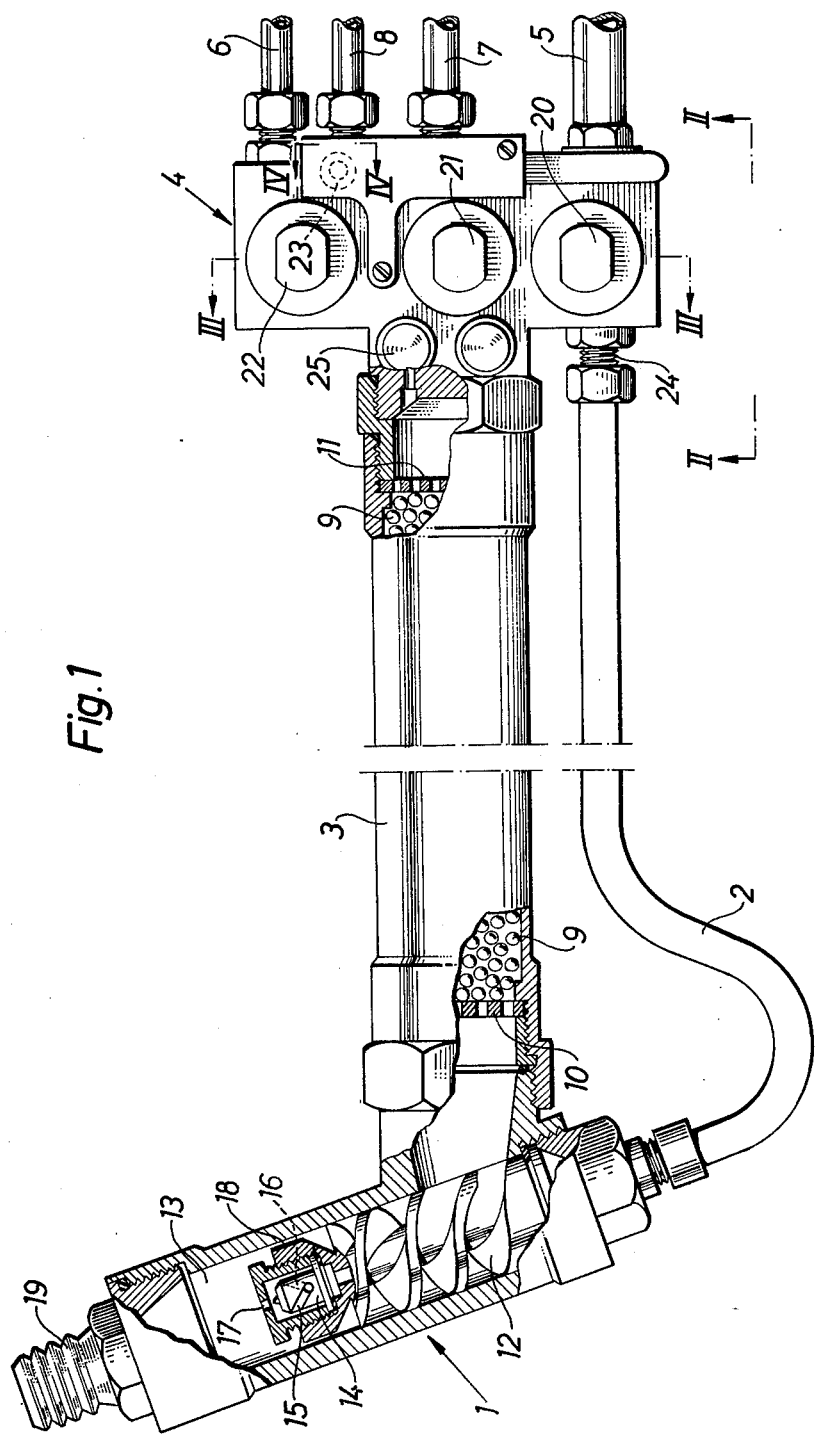
FIG. 1 shows an apparatus according to the invention, partly cut open.

In FIG. 1 the numeral 1 designates generally the portion in which the reaction components in the form of a foam component and an aerosol component are combined. 2 designates a conduit for the supply of the liquid aerosol component, and 3 designates a foam column of usual type, through which the foam component is driven by compressed air. A combined control and batching unit is generally designated by 4. To said unit 4 the aerosol component is supplied via a conduit 5, the foam component via a conduit 6, compressed air for foam production via a line 7 and control air for the unit 4 via a line 8.

The foam column 3 has the form of a tube filled with glass balls 9 defined by two perforated plates 10 and 11, respectively. Within said column 3 the foam component supplied via the conduit 6 is foamed. The foam component must contain a foaming agent or have the inherent tendency of forming foam while being pressed through the foam column by means of the compressed air supplied via the line 7. The foam is discharged into two helical grooves formed by a stationary screw 12, through which grooves the foam is pressed all the way to an annular inlet opening 18 for a mixing chamber 13. The aerosol component is supplied to the mixing chamber 13 via the conduit 2 and an axial passageway in the core of the screw 12 which opens into a spray mouthpiece or nozzle. Said nozzle is of known design and comprises a central body 14 provided with two grooves 15 and 16, respectively, located diametrically in front of each other. The aerosol component passing through said grooves 15, 16 is caused to rotate before it passes, via an aperture 17, in the form of a conicaly diverging jet, into the mixing chamber 13.

The foam component, which due to the screw 12 and the annular opening 18 is supplied to said mixing chamber 13 in the form of a helically rotating, substantially ring-shaped mass, thus is sprayed on its passage through the mixing chamber 13 with the aerosol component supplied through the aperture 17. As a result of the rotation of the foam mass, a large part of the outer surface of every foam bubble is met by the aerosol component and, consequently, the reaction product discharged through the discharge connection 19 is of a very homogeneous nature.

In the production of, for example, urea foam by spraying a resin solution onto a foamed hardener solution, it is desired that substantially all of the foam bubbles are coated with resin in order to obtain a cellular plastic with as many closed or substantially closed cells as possible. To attain this object, the individual foam bubbles in the mass supplied to the mixing chamber 13 can be caused to rotate relative to each other. This can be achieved in that the two helical grooves formed by the screw 12 and offset 180° in relation to each other are designed at their outer end portions with slightly different pitches. Accordingly, the mass passing in one screw groove is thrown into the mass passing in the other groove. This implies that the individual foam bubbles are given non-uniform moments of rotation so that the bubbles will rotate relative to each other while the foam mass passes in a rotating flow through the mixing chamber 13. The difference in pitch, between the outer end portions of the two helical grooves may be about 2°–6°. A pitch difference of about 4° has proved particularly suitable. This can be achieved by reducing the pitch in one groove by 2° and increasing the pitch in the other groove by 2° in relation to the normal pitch. The grooves thereby will still terminate 180° offset from each other. As regards the screw 12, it can be provided with a desired number of helical grooves, in which case, if the number exceeds one groove, the different grooves preferably terminate with the same angular distance relative to each other.

For obtaining a homogeneous reaction product not only during operation, but also in start and stop moments, the apparatus according to the invention is provided with the aforementioned control unit 4, which in the embodiment shown comprises three diaphragm valves 20, 21 and 22, one compressed-air operated control valve 23 and two adjustable throttle valves 24 and 25.

Figure 2:
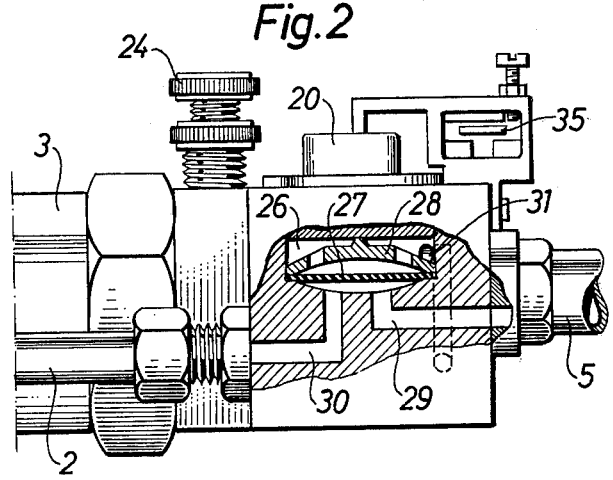
FIG. 2 is a side view of the control part of the apparatus, partly cut open, in the direction of the arrows II—II.

As is most clearly apparent from FIG. 2, each diaphragm valve comprises a chamber 26, a diaphragm 27 and a holding member 28 for the diaphragm. Into the part of the chamber 26 located beneath the diaphragm 27 opens a passageway 29, which communicates with the associated feed conduit, in this case with the conduit 5 for the aerosol component, and a passageway 30, which in this case is connected to the conduit 2 transporting the aerosol component to the mixing portion 1. In a corresponding manner, the diaphragm valve 21 is connected in between the line 7 for compressed air and the foam column 3, and the valve 22 is connected in between the conduit 6 for the foam component and the foam column 3. Into the part of the chamber 26 located above the diaphragm 27 opens in each diaphragm valve a passageway 31, which communicates with the control valve as will be explained below.

Figure 3:
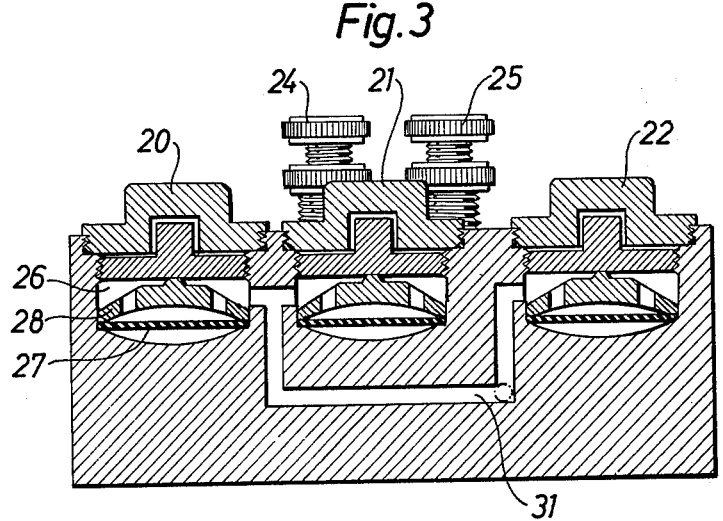
FIG. 3 is a section along the line III—III in FIG. 1.

Referring to FIG. 3, the upper portion of each chamber 26 in the diaphragm valves communicates with said passageway 31 extending from the control valve 23. In the passageways 30 (not shown in FIG. 3), which extend from the diaphragm valves 21 and 22 to the foam column 3, throttle valves 24 and 25, respectively, are coupled. By means of these locking valves the flow through said passageways can be finely adjusted to the desired value.

In the position shown in FIGS. 2 and 3, the diaphragm valves are open, i.e. a flow can pass from the passageway 29 via the lower portion of the chamber 26 and out through the passageway 30. When, however, the pressure on the upper surface of the diaphragm 27 exceeds the pressure in the passageway 29, the diaphragm will sealingly be pressed against the mouths of the passageways 29 and 30 in the chamber 26, whereby the valve is closed.

Figure 4:
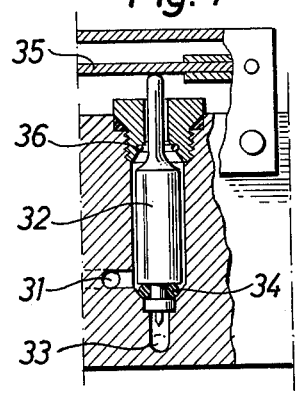
FIG. 4 is a partial section along the line IV—IV in FIG. 1.

For the control of the diaphragm valves a control valve shown in FIG. 4 is used which comprises a body 32 disposed in a cavity and acting as a piston somewhat movable in its axial direction. Into the bottom of said cavity a passageway 33 opens, which communicates with the control air line 8. The pressure in the line 8 is slightly higher than the pressure in the conduits and lines 5–7. Somewhat higher up in said cavity the passageway 31 opens, which extends to the parts of the valve chambers 26 located above the respective diaphragm 27.

In the position shown, the body 32 and an O-ring 34 provided about the lower portion of said body 32 are pressed to sealingly abut a shoulder portion in a said cavity which is designed as a valve seat. This means that the parts of the valve chambers 26 which are located above the respective diaphragm 27 communicate with the ambient atmosphere via the passageway 31 and said cavity. Due to the pressure in the conduits and lines 5–7 being higher than the atmospheric pressure, the diaphragm 27 is lifted up by the pressure in the respective passageway 29. Thus, all diaphragm valves are open.

When a control arm 35 holding the body 32 in its lower position is released, said body 32 will be lifted up by the overpressure in the passageway 33 and thereby seal against an O-ring 36 provided about its neck portion. In this position the control air with the higher pressure in the passageway 33 will be supplied via the passageway 31 to those parts of the valve chambers 26 which are located above the respective diaphragm 27 and thereby, owing to its higher pressure, press down the diaphragm to sealing abutment against the mouths of the passageways 29 and 30, whereby the diaphragm valves are closed. In order to re-open the diaphragm valves, the control arm 35 and body 32 again are pressed down, whereby the spaces above the diaphragm 27 again are evacuated and the control air passageway 33 is closed. The diaphragm 27 is thereby again lifted, and the valves are opened.

The control device shown, thus, renders it possible to simultaneously open and close all diaphragm valves by using only one control means. This is of great importance because it is hereby ensured, that correct mixing proportions are obtained immediately at the start and, respectively, are maintained until the apparatus is switched off. Said control unit can be enlarged by an arbitrary number of diaphragm valves, all of which can be controlled simultaneously from a single control valve. Thus, for example, several sprayers can, if desired, be connected and controlled in parallel.

What is claimed is:

1. A method of combining in a mixing chamber at least two chemical reaction components, one of which is a foam component which is caused to form a foam, and the other of which is an aerosol component which is atomized to aerosol form, prior to their combination in the mixing chamber, comprising:
   supplying the foam component to the mixing chamber via an annular slot;
   advancing the foam to the annular slot through two helical grooves which are offset substantially 180° relative to each other and which terminate with slightly different pitches;
   rotating the foam component while advancing same through the mixing chamber;
   rotating bubbles formed in the foam component relative to each other when the foam is being advanced through the mixing chamber; and
   spraying said foam component with the finely distributed droplets of the aerosol component while it is being rotatingly advanced through the mixing chamber.

2. A method according to claim 1, comprising:
   feeding the foam component into the mixing chamber through said helical grooves in the form of a helically rotating, substantially ring-shaped mass; and
   spraying the aerosol component into the mixing chamber in the form of a conically diverging jet from a point located substantially on the central axis of said ring-shaped mass.

3. A method according to claim 1, comprising:
   supplying compressed air to the foam component to form said foam prior to being advanced through the mixing chamber; and
   selectively connecting and disconnecting the flows of the foam component, the aerosol component and the compressed air utilized for the foam production substantially simultaneously with respective compressed-air controlled diaphragm valves.

4. A method according to claim 3, comprising controlling said compressed-air controlled diaphragm valves with a common source of control compressed air.

5. A method of combining in a mixing chamber at least two chemical reaction components, one of which is a foam component which is caused to form a foam, and the other of which is an aerosol component which is atomized to aerosol form, prior to their combination in the mixing chamber, comprising:
   supplying the foam component to the mixing chamber via an annular slot;
   advancing the foam to the annular slot through two helical grooves which are offset substantially 180° relative to each other and which terminate with different pitches;
   rotating the foam component while advancing same through the mixing chamber; and
   spraying said foam component with the finely distributed droplets of the aerosol component while it is being rotatingly advanced through the mixing chamber.

6. A method according to claim 5, comprising:
   feeding the foam component into the mixing chamber through said helical grooves in the form of a helically rotating, substantially ring-shaped mass; and
   spraying the aerosol component into the mixing chamber in the form of a conically diverging jet from a point located substantially on the central axis of said ring-shaped mass.

7. A method according to claim 5, comprising:
   supplying compressed air to the foam component to form said foam prior to being advanced through the mixing chamber; and
   selectively connecting and disconnecting the flows of the foam component, the aerosol component and the compressed air utilized for the foam production substantially simultaneously with respective compressed-air controlled diaphragm valves.

8. A method according to claim 7, comprising controlling said compressed-air controlled diaphragm valves with a common source of control compressed air.

9. An apparatus for combining, in a mixing chamber having an annular inlet slot, at least two chemical reaction components, one of which is a foam component which is caused to form a foam, and the other of which is an aerosol component which is atomized to aerosol form, prior to their combination in the mixing chamber, comprising:
   means for supplying the foam component to the annular inlet slot of the mixing chamber and for causing the foam component to rotate when it is being advanced through the mixing chamber, said foam component supplying means including two helical grooves which are offset substantially 180° relative to each other and which terminate with slightly different pitches for feeding the foam component to the annular inlet slot of the mixing chamber; and
   spraying means including a nozzle coupled to the mixing chamber for spraying the rotating foam component with atomized droplets of the aerosol component while the foam component is being rotatingly advanced in the mixing chamber, the nozzle being located substantially at the center of the annular slot.

10. An apparatus according to claim 9, wherein the difference in pitch between the outer ends of said grooves is about 2°–6°.

11. An apparatus according to claim 10, wherein the difference in pitch between the outer ends of said grooves is about 4°.

12. An apparatus according to claim 9, comprising supply conduits for the foam and aerosol components and a supply line for compressed air used for foam production, and further comprising compressed-air controlled diaphragm valves coupled to substantially simultaneously open and close, respectively, the supply conduits for the foam component and aerosol component and the supply line for the compressed air used for the foam production.

13. An apparatus according to claim 12, wherein said means for supplying the foam component to the mixing chamber comprises means for mixing the foam component with the compressed air used for foam production prior to supplying thereof to the mixing chamber.

14. An apparatus according to claim 3, wherein said compressed air and said foam component are mixed in said helical grooves.

15. An apparatus according to claim 12, wherein each of said diaphragm valves comprises a flexible diaphragm and two passageways opening on one side of said diaphragm, said diaphragm being arranged to prevent and permit, respectively, communication between the respective two passageways in response to a pressure difference between both sides of the diaphragm.

16. An apparatus according to claim 15, comprising a source of control compressed air coupled to the side of said flexible diaphragms of each of said valves which is opposite the side on which said two passageways open.

17. An apparatus according to claim 15, wherein said flexible diaphragm is arranged to prevent communication between the respective two passageways by sealing the openings thereof.

* * * * *